(12) United States Patent
Taha et al.

(10) Patent No.: US 8,426,501 B1
(45) Date of Patent: Apr. 23, 2013

(54) GENERATION OF POLYMER CONCRETES INCORPORATING CARBON NANOTUBES

(75) Inventors: Mahmoud Reda Taha, Albuquerque, NM (US); Usama Farid Kandil, Albuquerque, NM (US); Eslam Soliman, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 0 days.

(21) Appl. No.: 13/106,814

(22) Filed: May 12, 2011

Related U.S. Application Data

(60) Provisional application No. 61/395,420, filed on May 13, 2010.

(51) Int. Cl.
*C04B 14/38* (2006.01)
*C04B 28/00* (2006.01)

(52) U.S. Cl.
USPC ............... 524/5; 977/902; 977/742; 106/638; 106/816

(58) Field of Classification Search ...... 524/5; 977/902, 977/742; 106/638, 816
See application file for complete search history.

(56) References Cited

U.S. PATENT DOCUMENTS

2009/0229494 A1* 9/2009 Shah et al. ............... 106/816

* cited by examiner

*Primary Examiner* — Robert D. Harlan
(74) *Attorney, Agent, or Firm* — MH2 Technology Law Group, LLP

(57) ABSTRACT

Exemplary embodiments provide materials and methods for forming CNTs-polymer composites (e.g., CNTs-SBR latex nano-composites and/or CNTs-epoxy nano-composites), CNTs-polymer concrete, and CNTs-polymer modified cementitious composites. In one embodiment, a plurality of CNTs and a surfactant-containing polymer, including a surfactant attached to a polymer chain, can be dispersed within a cementitious matrix to form a CNTs-polymer modified cementitious composite with the surfactant non-covalently bonded to one or more CNTs.

14 Claims, 2 Drawing Sheets

GENERATION OF POLYMER CONCRETES INCORPORATING CARBON NANOTUBES

RELATED APPLICATIONS

This application claims priority to U.S. Provisional Patent Application Ser. No. 61/395,420, filed May 13, 2010, which is hereby incorporated by reference in its entirety.

BACKGROUND

Carbon nanotubes (CNTs) have been used as fillers in elastomer matrices due to their unique mechanical and thermal properties. However, there is limited success in incorporating CNTs in cementitious matrices.

Generally, three major challenges are associated with the production of effective CNTs reinforced nano-composites. These challenges are: (1) maintaining large aspect ratio of the nanotubes, (2) good dispersion of the fillers in the polymer matrix, and (3) the interfacial adhesion between different phases. The large aspect ratio is necessary to maximize the surface area to achieve optimal load transfer from the polymer or cement matrix to the nanotubes. Due to the Van Der Waals attraction, nanotubes are held together as bundles and ropes. CNTs have very low solubility in solvents and tend to remain as entangled agglomerates. The agglomeration (entanglement) of carbon nanotubes in the elastomeric matrix diminishes the reinforcing effects. Therefore, effective use of CNTs in nano-composite applications depends on the ability to uniformly disperse the CNTs throughout the matrix without reducing their aspect ratio.

Polymer-modified concrete and polymer concrete are materials which involve concrete-polymer composites. They are made by partially or fully replacing the cement hydrate binders of conventional cement mortar or concrete with polymers, i.e., polymeric admixtures or cement modifiers, and by strengthening or replacing the binders with the polymers. This polymer concrete composite and mortars are currently used as popular construction materials. Polymer concrete has been used in the last 40 years in many applications ranging from bridge deck overlays, lining for sewer lines, to parking structures floors and in other structural applications such as machinery foundation and utility structures.

The use of different types of synthetic chopped fibers (5 mm length) in concrete composites has been suggested and has shown to slightly enhance the tensile and flexural strength of the concrete composites. However, dispersion of synthetic fibers in concrete composites is difficult due to the increased viscosity as compared to normal concrete. Additionally, synthetic fibers often enhance the crack arresting mechanism developed typically by the polymer film when hardened.

Thus, there is a need to overcome these and other problems of the prior art and to provide materials and methods for generating polymer-modified composites incorporating CNTs.

SUMMARY

According to various embodiments, the present teachings include a composite material. The composite material can include a plurality of carbon nanotubes (CNTs) and a surfactant-containing polymer having a surfactant attached to a polymer chain. The plurality of CNTs and the surfactant-containing polymer can be dispersed within a cementitious matrix, the surfactant of the surfactant-containing polymer non-covalently bonded to one or more CNTs of the plurality of CNTs. The plurality of CNTs can be dispersed substantially without agglomeration in the cementitious matrix.

According to various embodiments, the present teachings also include a method of forming a composite material. In this method, an aqueous CNT dispersion can be provided including a plurality of carbon nanotubes (CNTs). A surfactant-containing polymer dispersion can also be provided including a surfactant attached to a polymer chain. The surfactant-containing polymer dispersion can then be shear-mixed with the aqueous CNTs dispersion, wherein the surfactant of the surfactant-containing polymer can be non-covalently bonded to one or more CNTs of the plurality of CNTs to form a CNTs-surfactant-polymer composite in the shear-mixed dispersion. This shear-mixed dispersion containing the CNTs-surfactant-polymer composite can then be added in a cement mixing process to produce a wet CNTs-polymer-modified cementitious composite. The plurality of CNTs can be dispersed substantially without agglomeration in the wet CNTs-polymer-modified cementitious composite, which can then be cured to form the disclosed CNTs-polymer-modified cementitious composite.

According to various embodiments, the present teachings further include a composite material. The composite material can include a plurality of carbon nanotubes (CNTs) and a surfactant-containing polymer having a surfactant attached to a polymer chain. The surfactant of the surfactant-containing polymer can be non-covalently bonded to one or more CNTs of the plurality of CNTs to form a CNTs-surfactant-polymer composite and the plurality of CNTs can be dispersed substantially without agglomeration. The composite material can also include a cementitious matrix including a plurality of voids within the cementitious matrix. The CNTs-surfactant-polymer composite can be dispersed to fill the plurality of voids to form a CNTs-polymer-modified cementitious composite.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate several embodiments of the present teachings and together with the description, serve to explain the principles of the invention.

DESCRIPTION OF THE EMBODIMENTS

Reference will now be made in detail to exemplary embodiments of the present teachings, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Exemplary embodiments provide materials and methods for forming CNTs-surfactant-polymer composites (e.g., CNTs-SBR latex nano-composites) and CNTs-polymer modified cementitious composites. The CNTs-polymer modified cementitious composite can include CNTs-polymer modified mortar and CNTs-polymer modified concrete.

An exemplary CNTs-polymer modified cementitious composite can include a plurality of CNTs and a surfactant-containing polymer, including a surfactant attached to a polymer chain, dispersed within a cementitious matrix. The surfactant of the surfactant-containing polymer can be non-covalently bonded to one or more CNTs of the plurality of CNTs. In one embodiment, the CNTs and the surfactant-containing polymer can form CNTs-surfactant-polymer composites dispersed to fill the voids/pores within the cementitious matrix to form the exemplary CNTs-polymer modified cementitious composites.

CNTs can be dispersed in the CNTs-surfactant-polymer composites as well as the CNTs-polymer modified cementitious composites substantially without agglomeration to improve (e.g., increase) their mechanical, thermal, microstructural and/or other properties. For example, addition of CNTs can enhance Young's modulus, strength, strain at failure (i.e., failure strain), toughness, and/or thermal stability of the CNTs-surfactant-polymer composites and their modified cementitious composites.

As disclosed herein, the term "without agglomeration" refers to distribution (or dispersing) of CNTs within a matrix, wherein the CNTs are de-bundled. The distribution of CNTs within the matrix can be homogeneous or uniform or otherwise de-bundled. The matrix for dispersing the CNTs can include, e.g., a matrix formed of a surfactant-containing polymer, a matrix formed of a cementitious matrix, and/or a matrix formed of a polymer modified cementitious matrix.

Figure 1:
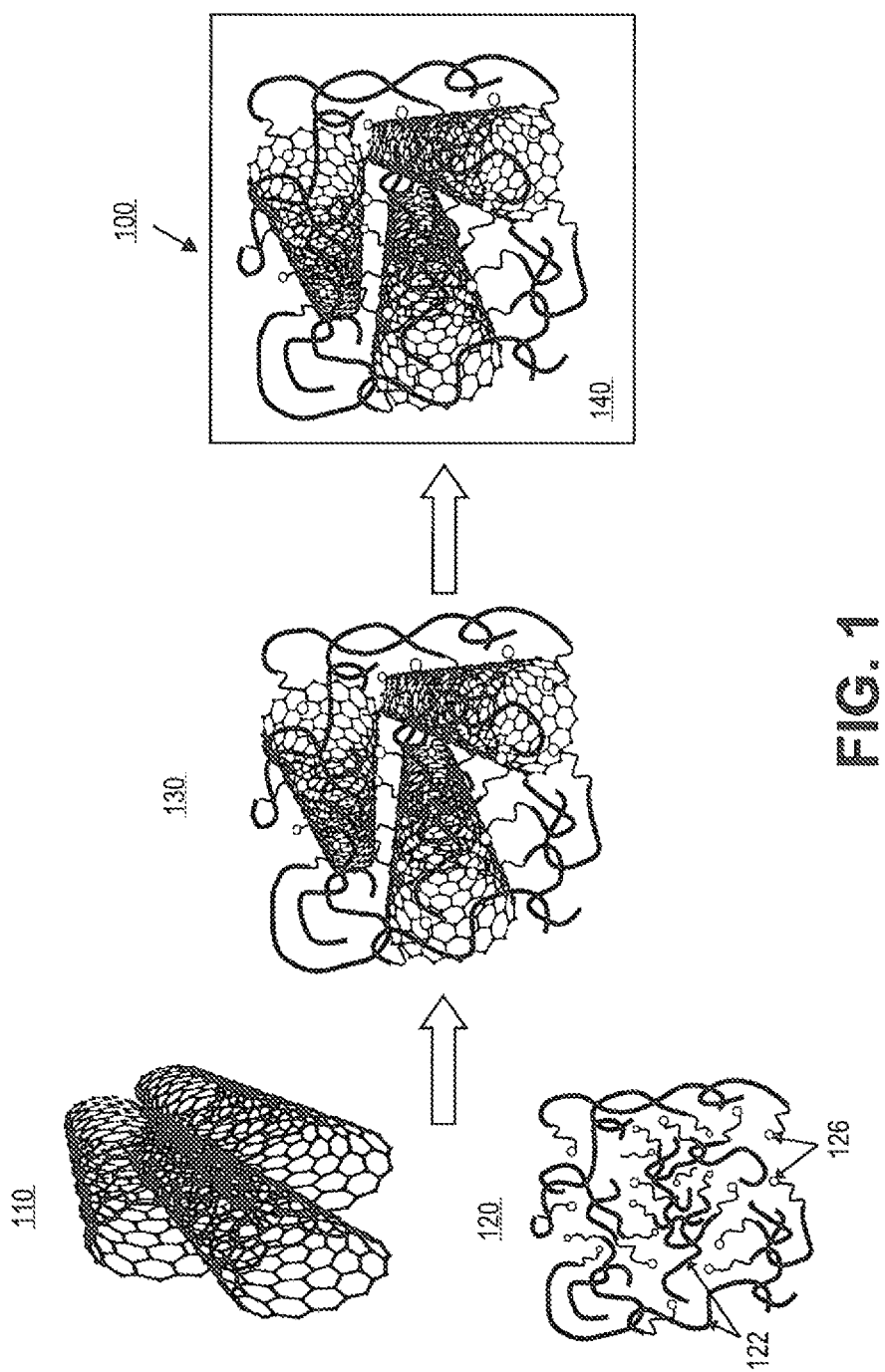
FIG. 1 depicts an exemplary method for forming CNTs-surfactant-polymer composites along with CNTs-polymer-modified cementitious composites in accordance with various embodiments of the present teachings.

FIG. 1 depicts an exemplary method for forming CNTs-surfactant-polymer composites along with CNTs-polymer-modified cementitious composites in accordance with various embodiments of the present teachings.

As shown in FIG. 1, a plurality of CNTs 110 can be provided. The CNTs 110 can be dispersed in an aqueous medium, e.g., facilitated by sonication, to form an aqueous CNTs dispersion. The aqueous CNTs dispersion can be uniform.

As used herein and unless otherwise specified, the term "carbon nanotubes" or CNTs refers to an elongated carbon material that has at least one minor dimension, for example, width or diameter, of about 100 nanometers or less. In embodiments, CNTs in bundles can be used. The CNTs can have an average outer diameter ranging from about 8 nm to about 80 nm, or from about 20 nm to about 30 nm, an average inner diameter ranging from about 2 nm to about 10 nm, or from about 5 nm to about 10 nm, and an average aspect ratio ranging from about 100 to about 4000 or from about 500 to about 1000, although the dimensions of the CNTs are not limited.

In one embodiment, the CNTs can be considered as one atom thick layers of graphite, called graphene sheets, rolled up into nanometer-sized cylinders, tubes or other shapes. Although FIG. 1 schematically illustrates a circular cross section for the exemplary CNTs, one of ordinary skill in the art would understand that the CNTs can have various other cross sectional shapes, regular or irregular, such as, for example, a rectangular, a polygonal, and/or an oval shape. In embodiments, the CNTs can include single wall carbon nanotubes (SWCNTs), multi-wall carbon nanotubes (MWCNTs), and/or their various functionalized and derivatized fibril forms. In embodiments, the CNTs can be modified CNTs including a physical and/or a chemical modification on their surface.

Referring back to FIG. 1, a surfactant-containing polymer 120 can be provided including a surfactant 126 attached to a polymer chain 122. The surfactant-containing polymer 120 can be dispersed in water or in a form of polymer latex.

In embodiments, the polymer chain 122 can be a polymer chain of a thermoplastic polymer and/or a thermoset polymer. Exemplary thermoplastic polymer can include styrene butadiene rubber (SBR), acrylonitrile butadiene styrene (ABS), poly(methyl methacrylate) (PMMA), polyethylene, polypropylene, polyvinyl chloride (PVC), polystyrene, polytetrafluoroethylene (PTFE, commonly known as Teflon), polyester, and/or polyamide (commonly known as nylon). Exemplary thermoset polymer can include epoxy, natural rubber, urea-formaldehyde, and/or polyester resins.

The surfactant 126 can be any suitable surfactants. Generally, surfactants can be classified according to the charge of their polar head groups (or the hydrophilic region of the molecule), as a cationic, anionic, nonionic or zwitterionic surfactant. The hydrophobic region or the tail groups of surfactants can usually include one or few hydrocarbon chains. Use of the surfactant 126 can lower the surface tension of CNTs and prevent aggregates of CNTs. In embodiments, the surfactant 126 can include an ionic (either cationic or anionic) surfactant region and a nonionic surfactant region to facilitate CNTs to overcome strong van der Waals' attractions by electrostatic/steric repulsive forces. In other words, anionic (or cationic) and nonionic surfactant regions can pave the way of exfoliation of CNTs in the surfactant-containing polymer (e.g., SBR-Latex) because of a combination of electrostatic (anionic or cationic surfactant) and steric (nonionic surfactant) stabilization.

Exemplary surfactant 126 can include a surfactant region of sodium-dodecyl-sulfate (SDS with hydrophilic-lipophilic balance (HLB)<10) and a surfactant region of polyoxyethylene-(100)-stearyl ether (with HLB>10). Other suitable surfactants can include, but are not limited to, alkylbenzenesulfonates (e.g. sodium dodecylbenzenesulfonate), dialkyl sulfosuccinates (e.g. sodium dodecylsulfosuccinate) and/or polyoxyethylene alkylphenyl ether sulfates (e.g. sodium polyoxyethylene alkylphenyl ethoxy sulfate). The surfactant 126 can be covalently or non-covalently attached to the polymer chain 122.

In embodiments, the aqueous CNT dispersion containing the CNTs 110 can be mixed, e.g., shear-mixed, with the dispersion containing the surfactant-containing polymer 120, e.g., SBR latex. A sonication or ultrasonication can be used for the mixing. The surfactant 126 (e.g., an anionic/nonionic surfactant) of the surfactant-containing polymer can be first adsorbed on the CNTs surfaces and then at least partially functionalize the CNTs (e.g., MWCNTs). Due to the shell-mixing process, CNTs 110 can be de-bundled or stabilized by steric and electrostatic repulsions provided by the surfactant 126. The surfactant 126 can serve as a coupling agent or a bridge between the polymer 122 and CNTs 110 to form a CNTs-surfactant-polymer composite 130 in the shear-mixed dispersion without disturbing CNTs' structure or without introducing defects.

In an exemplary embodiment where SBR latex containing stabilizing surfactants is used, the SBR can entangle the lipophilic parts of the surfactants. Under ultrasonication, CNTs can be de-bundled and become individually attracted to either part of the surfactants. This is because the exemplary ultrasonic treatment can provide high local shear, particularly to the CNTs bundle ends. Once spaces or gaps at the bundle ends are formed, they can be propagated by surfactant adsorption via non-covalent bonds, ultimately separating the individual CNTs from the bundle.

In one embodiment, the CNTs-surfactant-polymer composite 130 can be extracted from the homogeneous, shear-mixed dispersion by a demuslification process to precipitate the CNTs-surfactant-polymer composite 130 (e.g., CNTs-SBR nanocomposite). The precipitated solids can then be washed and/or re-dissolved in a suitable solvent (e.g., toluene) for suitable use, e.g., to form a film of the CNTs-surfactant-polymer composite. The CNTs 110 can be dispersed within the CNTs-surfactant-polymer composite 130 substantially without agglomeration.

The homogeneous, shear-mixed dispersion containing the CNTs-surfactant-polymer composite 130 can then be admixed in a cement mixing process to produce a wet composite of CNTs-polymer-modified cementitious composite. The cement mixing process can be any suitable known process for forming a cementitious matrix 140 of a cement mortar and/or a cement concrete. For example, the cement mixing can include mixing a cement compound, an aggregate, and water according to standard ASTMC. The cement compound can be, e.g., Portland cement including Type I, Type II, Type III, Type IV and/or Type V Portland cement, White cement, Masonry cement, Blended hydraulic cement, and/or Type G or Type H oil well cement. Cements with surface area ranging from about 250 $m^2$/kg to about 500 $m^2$/kg with initial setting time of about 1-3 hours and final setting time of about 6-12 hours. Exemplary aggregate can include limestone, silica sand, Ottawa sand, alumina sand, sandstone, gravel, basalt and/or bauxite aggregate. Typical aggregate can have a porosity of about 20% to about 30%. An exemplary sand to cement ratio can be 3:1 by weight. Other ratios can be used based on specific applications. In embodiments, cement compound can be partially or fully replaced by the polymer. In some cases, limestone powder, silica and other fillers can be used when cement compound is replaced with a polymer.

In embodiments, the wet CNTs-polymer-modified cementitious composite can include a certain amount of water contributed from each mixing of CNT dispersion, surfactant-containing polymer dispersion, the cement mixing, etc. The wet CNTs-polymer-modified cementitious composite can have a total water/cement ratio ranging from about 0.25 to about 0.55 or from about 0.40 to about 0.50. The wet CNTs-polymer-modified cementitious composite can then be cured according to standard cement formation processes to form the disclosed CNTs-polymer-modified cementitious composite 100, as shown in FIG. 1. An exemplary curing process can include a wet curing (hydration), followed by a drying curing. In embodiments, dry curing only can be used when cement compound is completely replaced by a polymer. In embodiments, CNTs can be dispersed substantially without agglomeration in the wet composite and/or the cured composite of the CNTs-polymer-modified cementitious composite 100.

The CNTs 110 can be present in an amount ranging from about 0.05% to about 5% or from about 0.5% to about 1.5% by weight of the surfactant-containing polymer 120 to form desirable composites. The surfactant-containing polymer 120 can be present in an amount ranging from 5% to 100% or ranging from 10% to 20% by weight of a cement compound of the cementitious matrix.

In embodiments, the CNTs-surfactant-polymer composite 130 can fill the voids/pores of the cementitious matrix (cured from cement/sand/water) 140 to form the disclosed CNTs-polymer-modified cementitious composite 100. In embodiments, the CNTs-surfactant-polymer composite 130 can provide enhanced Young's modulus of more than about 6 MPa or ranging from about 6 MPa to about 18 MPa, ultimate strength of more than about 0.38 MPa or ranging from about 0.38 MPa to about 0.44 MPa, and/or toughness of more than about 75 kPa·mm/mm or ranging from about 75 kPa·mm/mm to about 110 kPa·mm/mm. The CNTs-surfactant-polymer composite 130 can provide thermal stability increase of more than about 10° C., when CNTs 110 are present in an amount of more than about 1.5% by weight of the surfactant-containing polymer 120.

The incorporation of the CNTs-surfactant-polymer composite 130 with desirable properties can also increase mechanical, thermal, structural properties of the cementitious matrix 140. For example, the formed CNTs-polymer modified cementitious composite 100 can have an increased compressive strength of more than about 14.5 MPa or ranging from about 14.5 MPa to about 17.0 MPa after 28 days of curing and a tensile strength of more than about 2.2 MPa or ranging from about 2.2 MPa to about 3.0 MPa after 28 days of curing.

The CNTs-polymer modified cementitious composite 100 can further have a flexural stiffness of more than about 3680 N/mm or ranging from about 3680 N/mm to about 5500 N/mm.

The CNTs-polymer modified cementitious composite 100 can have a mean failure strain of more than about 0.2%, for example, ranging from about 0.2% to about 0.9%, and a toughness of more than about 43 MPa-mm/mm or ranging from about 43 MPa-mm/mm to about 63 MPa-mm/mm. Generally, the higher the failure strain, and the higher toughness. The ability of CNTs to increase the toughness (energy absorption) as well as the strain at failure of the composite 100 can be beneficial in practical applications, for example, when the composite is used as overlays or as intermediate media for bond where shrinkage represents a significant problem. Increase in failure strain and toughness can enhance the material ability to resist restrained shrinkage without failure.

In embodiments, the CNTs-polymer modified cementitious composite 100 can have a reduced porosity. The porosity of the CNTs-polymer modified cementitious composite 100 can be of about 50% to about 70% less than that of normal concrete.

The following examples primary relate to formation of a CNTs-latex modified mortar (LMM) as an exemplary CNTs-polymer-modified concrete composite in accordance with various embodiments of the present teachings. The examples are not to be taken as limiting the disclosure or claims in any way.

EXAMPLES

Example 1

Latex Modified Mortar (LMM) with or without CNTs

Styrene-butadiene rubber latex (SBR-Latex) was used as an exemplary surfactant-containing polymer and as a dispersing medium for exemplary MWCNTs via its surfactants constituent, forming a CNTs-SBR nano-composite. This CNTs-SBR nano-composite was then used for producing a CNTs-latex modified mortar (LMM) as an exemplary CNTs-polymer-modified cementitious composite.

The SBR-Latex was supplied by the Euclid Chemical Company (LaFayette, Ga.) having Chemical composition as shown in Table 1. This exemplary latex contained an anionic and nonionic surfactant system including sodium-dodecyl-sulfate (SDS with HLB=8) and polyoxyethylene-(100)-stearyl ether (Brij 700 with HLB=19).

TABLE 1

| Material | Parts by weight |
| --- | --- |
| Styrene | 64.0 |
| Butadiene | 35.0 |
| A Vinyl Carboxylic Acid | 1.0 |
| Nonionic Surfactant | 7.0 |
| Anionic Surfactant | 0.1 |
| Water | 105.0 |

MWCNTs were supplied by Cheap Tubes, Inc. and were used as received. Based on the manufacturer's specifications, the MWCNTs were multi-walled with an outer diameter (OD) of about 20-30 nm, an inner diameter (ID) of about 5-10 nm, and a length of about 10-30 μm. The bulk density of MWCNTs was about 0.21 gm/cm$^3$ and the specific surface area was about 110 m$^2$/gm.

The Portland cement used was low alkali Portland cement manufactured according to ASTMC150 2009 standards known as Type I/II cement. Standard Ottawa sand meeting ASTMC778 2006 standards were used to produce the exemplary mortar mix.

Table 2 lists the mix proportions by weight for the latex modified mortars (LMM) with and without CNTs.

TABLE 2

| Sample | Mix | Cement (kg/m$^3$) | Sand (kg/m$^3$) | Water (kg/m$^3$) | SBR Latex (kg/m$^3$) | CNTs (kg/m$^3$) |
| --- | --- | --- | --- | --- | --- | --- |
| 1 | Standard Mortar | 530 | 1,457.5 | 257.1 | — | — |
| 2 | LMM | 530 | 1,457.5 | 177.6 | 79.5 | — |
| 3 | LMM/CNTs-1 | 530 | 1,457.5 | 177.6 | 79.5 | 0.4 |
| 4 | LMM/CNTs-2 | 530 | 1,457.5 | 177.6 | 79.5 | 0.8 |
| 5 | LMM/CNTs-3 | 530 | 1,457.5 | 177.6 | 79.5 | 1.2 |

Sample 1 in Table 2 contained neither SBR latex nor CNTs, and prepared based on standard mortar cast according to ASTMC109 2008 and then wet cured for about 7 days according to ASTMC192 2007.

Sample 2 was LMM having SBR latex of about 15% by weight of the cement content of the standard Portland cement but without CNTs. Samples 3, 4, and 5 were respectively incorporated with about 0.5%, 1.0%, and 1.5% CNTs by weight of the SBR latex in Sample 2.

Water content in the LMM mixes of Samples 2-5 was reduced from 48.5% of the cement content by weight (as in Sample 1) to about 33.5% in order to compensate for the additional water existing in the SBR latex such that the water/cement ratio in the final mixes was about 0.335. Samples 2-5, the LMM specimens with or without CNTs, were wet cured for two days and dry cured for the following five days, according to a typical curing regime for latex modified cemenititous composites (ACI-2009). The early wet curing for LMM specimens allowed the cement hydration to take place while the later dry curing allowed the polymer film to slowly form and produce a polymer matrix that is interwoven with the cement matrix.

For forming Samples 3-5 of CNTs-LMM, the mixing procedure of the MWCNTs with the SBR latex was performed as follows: MWCNTs were first mixed with 400 ml of deionized water and then ultrasonicated for approximately 30 minutes. This water was a part of the mixing water to produce LMM. Subsequently, this aqueous CNTs dispersion was mixed with 400 ml of the SBR latex and then kept in an ultrasound bath for approximately 2 hours. As a result, CNTs were well dispersed in SBR-latex, which was then added in a cement mortar mixing process to produce the exemplary LMM or CNTs-LMM.

Compressive strength and tensile strength were tested for Samples 3-5 in Table 2 according to ASTM standards. For the compressive strength test, cubic samples of about 50.8-mm and prism samples of about 50.8×50.8×140 mm were tested to failure for each of Samples 3-5 according to ASTM C109 with loading rate of 5.34 kN/min using compression testing machine supplied by Instron® Corporation. The compressive strength tests were performed after 7 days and 28 days of curing. The direct tension test was performed using MTS® Bionix servo hydraulic system. The sampling rate was 10 Hz and the measurements were collected by MTS® 793 data acquisition system.

Table 3 depicts mean compressive strength for LMM with and without CNTs after 7 and 28 days of curing. The significance of MWCNTs on the compressive strength of LMM was at later age rather Wan at early age (e.g., 7 days of age) with and without MWCNTs. This is because polymer modified mortar needed time to reach its stiffness and strength. As the polymer latex became further stiff at 28 days, the MWCNTs-SBR nano-composite stiffness resulted in limited tension and micro-cracks and therefore enhanced compressive strength of CNTs-LMM as compared with LMM without CNTs.

TABLE 3

| Sample | Mix | CNTs content | 7 days (MPa) | 28 days (MPa) |
| --- | --- | --- | --- | --- |
| 2 | LMM | 0% | 9.21 ± 0.74 | 13.06 ± 1.93 |
| 3 | LMM/CNTs-1 | 0.5% | 8.67 ± 2.09 | 15.91 ± 2.30 |
| 4 | LMM/CNTs-2 | 1.0% | 7.96 ± 1.92 | 16.12 ± 0.3 |
| 5 | LMM/CNTs-3 | 1.5% | 11.72 ± 2.27 | 15.47 ± 0.93 |

Table 4 depicts tensile strength of exemplary LMM specimens cured for 7-days or 28 days.

TABLE 4

| Sample | Mix Designation | CNTs content | 7 days (MPa) | 28 days (MPa) |
| --- | --- | --- | --- | --- |
| 2 | LMM | 0% | 1.15 ± 0.22 | 2.31 ± 0.32 |
| 3 | LMM/CNTs-1 | 0.5% | 1.11 ± 0.24 | 2.52 ± 0.3 |
| 4 | LMM/CNTs-2 | 1.0% | 1.39 ± 0.53 | 2.45 ± 0.34 |
| 5 | LMM/CNTs-3 | 1.5% | 0.89 ± 0.13 | 2.76 ± 0.33 |

As shown in Table 4, the addition of MWCNTs showed a significantly enhanced tensile strength at 28 days of age (as opposed to 7 days of age), where about 0.5%, 1.0%, and 1.5% MWCNTs contents showed an increase in tensile strength by about 10%, 6%, and 20° A), respectively.

Figure 2:
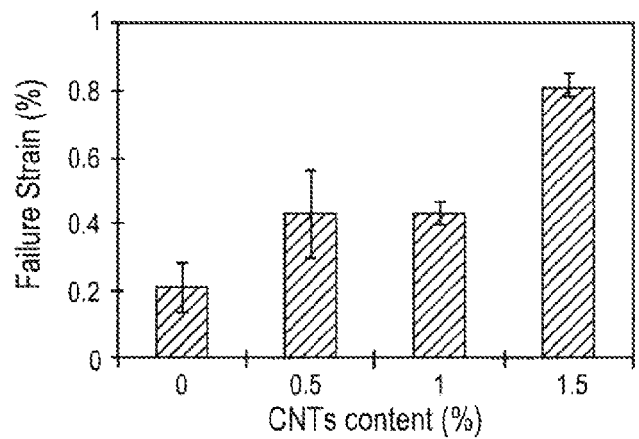
FIG. 2 depicts strain at failure for exemplary latex modified mortar (LMM) materials in accordance with various embodiments of the present teachings.
Figure 3:
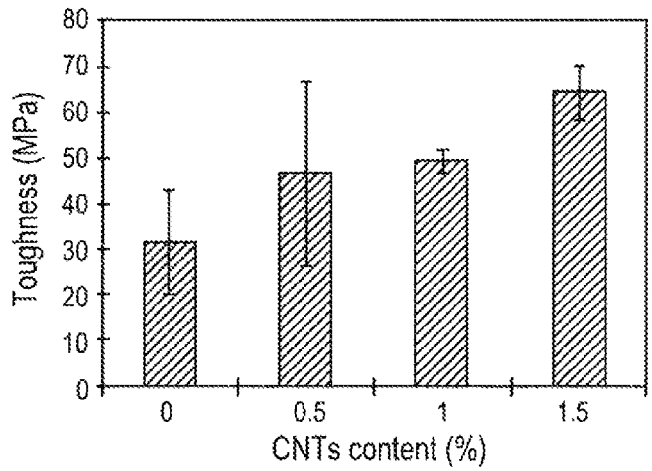
FIG. 3 depicts toughness for exemplary LMM materials in accordance with various embodiments of the present teachings.

The LMM samples with relatively higher CNT contents tended to deform more than those with less CNTs contents, which increased the strain at failure (or failure strain) of the formed CNTs-LMM. The mean failure strains of LMM with and without CNTs are compared in FIG. 2 after a 7-day curing. The mean failure strains for samples of about 0, 0.5%, 1.0° A), and 1.5% CNTs were about 0.21° A), 0.43%, 0.43° A), and 0.81% respectively. The percentages of increasment in failure strain were about 109%, 108%, and 290% respectively as compared with LMM specimens without MWCNTs. The enhancement in the failure strain was associated with similar enhancement in toughness measured as the area under the stress-strain curve. The toughness of the LMM samples is compared in FIG. 3. As indicated, the toughness of LMM samples increased by about 48%, 57%, and 105° A. corresponding to MWCNTs contents of about 0.5° A), 1.0%, and 1.5° A), respectively.

The SEM micrographs for 1.5% MWCNTs-LMM sample at 7 days of age showed calcium hydroxide (CH) crystals and typical hydration products of the cement matrix. The 1.5% CNTs-LMM sample was also observed that CNTs-SBR composite filled the voids within the cementitious matrix. MWCNTs were well dispersed in the interwoven microstructure of polymer latex and the cement hydration. MWCNTs bridged a micro-crack in the cement-latex composite.

Example 2

CNTs-SBR Nanocomposites

MWCNTs-SBR nanocomposite was produced by mixing aqueous MWCNTs with SBR-latex dispersion and then demulsified by adding methanol/hydrochloric acid to the CNTs-SBR latex dispersion. The demuslification process precipitated CNTs-SBR nanocomposite, which was then washed with methanol. The CNTs-SBR nanocomposite was dissolved in toluene. Thin films of CNTs-SBR nanocomposite were produced by solvent evaporation of the dissolved composite at room temperature followed by drying in vacuum oven at about 40° C. for about 24 hours.

Figure 4:
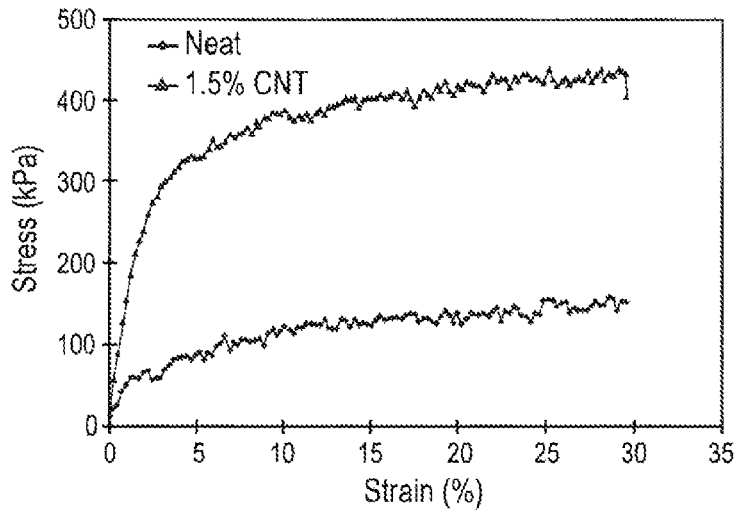
FIG. 4 depicts stress-strain response for exemplary styrene butadiene rubber (SBR) materials in accordance with various embodiments of the present teachings.

FIG. 4 depicts the tensile stress-strain response of neat SBR and 1.5% MWCNTs-SBR nano-composite films. As indicated, the Young's modulus, ultimate strength, and toughness of the neat SBR film were about 5.54 MPa, 156 kPa, and 34.45 kPa·mm/mm, respectively. As calculated from FIG. 4, the enhancements of CNTs reached about 226%, 181%, and 220% for the Young's modulus, ultimate strength, and toughness respectively.

In addition to the mechanical response of the CNTs-SBR films, network of fine cracks was appeared on the surface of the MWCNTs-SBR nano-composite films, showing resistance to deformation due to the presence of the MWCNTs.

MWCNTs were observed to be dispersed homogeneously in the rubbery SBR matrix by SEM images. The diameter of the CNTs was about 40 nm. The length of the CNTs varied from a few to several hundred nanometers. The embedded MWCNTs were wrapped by the SBR polymer matrix without significantly pulling out at the fractured surface. A thicker layer of SBR was appeared cover the MWCNTs surface, which indicates some degree of wetting and phase adhesion. This observation demonstrated the bond between the nanotubes and the surrounding SBR matrix.

Thermogravimetric analysis (TGA) curves showed that the addition of MWCNTs enhanced the thermal stability of the SBR polymer network containing MWCNTs. The thermal decomposition temperatures for neat SBR and its nanocomposites with 0, 0.5%, 1.0% and 1.5% MWCNTS contents were about 412° C., 414° C., 416° C., 419° C., and 422° C., respectively. This increasment in thermal stability, e.g., about 10° C. increasment with the addition of about 1.5% MWCNTs, was attributed to the presence of the uniformly dispersed MWCNTs in the SBR matrix.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. The term "at least one of" is used to mean one or more of the listed items can be selected.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g. −1, −1.2, −1.89, −2, −2.5, −3, −10, −20, −30, etc.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A composite material comprising:
   a cementitious matrix;
   a plurality of carbon nanotubes (CNTs); and
   a surfactant-containing polymer comprising a surfactant attached to a polymer chain,
   wherein the plurality of CNTs and the surfactant-containing polymer are dispersed within the cementitious matrix with the surfactant of the surfactant-containing polymer non-covalently bonded to one or more CNTs of the plurality of CNTs;
   the plurality of CNTs are dispersed substantially without agglomeration in the cementitious matrix; and
   the surfactant-containing polymer is present in an amount ranging from 10% to 20% by weight of a cement compound of the cementitious matrix.

2. The material of claim 1, wherein the surfactant attached to the polymer chain comprises an ionic surfactant region and a nonionic surfactant region.

3. The material of claim 1, wherein the plurality of CNTs is present in an amount ranging from about 0.05% to about 5% by weight of the surfactant-containing polymer.

4. The material of claim 1, wherein each of the plurality of CNTs has an average outer diameter ranging from about 8 nm to about 80 nm and an average inner diameter ranging from about 2 nm to about 10 nm.

5. The material of claim 1, wherein each of the plurality of CNTs comprises an aspect ratio ranging from about 100 to about 4000.

6. The material of claim 1, wherein each of the plurality of CNTs comprises a single wall carbon nanotube (SWCNTs), a multi-wall carbon nanotube (MWCNTs), or a combination thereof.

7. The material of claim 1, wherein the cementitious matrix comprises a cement compound and an aggregate comprising sand.

8. The material of claim 1, wherein the cementitious matrix is a cement mortar or a cement concrete.

9. The material of claim 1, wherein the polymer chain comprises a thermoplastic polymer, a thermoset polymer, or a combination thereof.

10. The material of claim 1, wherein the polymer chain comprises styrene butadiene rubber (SBR), poly(methyl methacrylate) (PMMA), polyester, acrylonitrile butadiene styrene (ABS), polyethylene, polypropylene, polyvinyl chloride (PVC), polystyrene, polytetrafluoroethylene (PTFE), epoxy, polyamide natural rubber, urea formaldehyde, polyester resin, or combinations thereof.

11. The material of claim 1, wherein the CNTs-polymer modified cementitious composite has a flexural stiffness of more than about 3680 N/mm, a mean failure strain of more than about 0.2%, or a toughness of more than about 43 MPa·mm/mm.

12. A composite material comprising:
a plurality of carbon nanotubes (CNTs);
a surfactant-containing polymer comprising a surfactant attached to a polymer chain, wherein the surfactant of the surfactant-containing polymer is non-covalently bonded to one or more CNTs of the plurality of CNTs to form a CNTs-surfactant-polymer composite and wherein the plurality of CNTs are dispersed within the CNTs-surfactant-polymer composite substantially without agglomeration; and
a cementitious matrix comprising a plurality of voids within the cementitious matrix, wherein the CNTs-surfactant-polymer composite is dispersed to fill the plurality of voids to form a CNTs-polymer-modified cementitious composite,
wherein the polymer chain comprises styrene butadiene rubber (SBR), poly(methyl methacrylate)(PMMA), polyester, acrylonitrile butadiene styrene (ABS), polyethylene, polypropylene, polyvinyl chloride (PVC), polystyrene, polytetrafluoroethylene (PTFE), epoxy, polyamide natural rubber, urea-formaldehyde, polyester resin, or combinations thereof.

13. The material of claim 12, wherein the CNTs-surfactant-polymer composite has a Young's modulus of more than about 12 MPa, an ultimate strength of more than about 0.28 MPa, or a toughness of more than about 75 kPa·mm/mm.

14. The material of claim 12, wherein the CNTs-surfactant-polymer composite has a thermal stability increasment of more than about 10° C., when the plurality of CNTs is present in an amount of more than about 1.5% by weight of the surfactant-containing polymer.

* * * * *